US007104334B2

(12) United States Patent
Thompson

(10) Patent No.: US 7,104,334 B2
(45) Date of Patent: Sep. 12, 2006

(54) DEPLOYABLE AUTOMATIC FOAMING FIRE PROTECTION SYSTEM

(75) Inventor: Paul Thompson, Walnut Grove, CA (US)

(73) Assignee: Foaming Protection, Inc., Carson City, NV (US)

( * ) Notice: Subject to any disclaimer, the term of this patent is extended or adjusted under 35 U.S.C. 154(b) by 0 days.

(21) Appl. No.: 10/978,077

(22) Filed: Oct. 28, 2004

(65) Prior Publication Data

US 2005/0092502 A1 May 5, 2005

Related U.S. Application Data

(60) Provisional application No. 60/515,884, filed on Oct. 29, 2003.

(51) Int. Cl.

| | |
|---|---|
| ***A62C 11/00*** | (2006.01) |
| *A62C 2/00* | (2006.01) |
| *A62C 3/00* | (2006.01) |
| *A62C 8/00* | (2006.01) |
| *G05D 7/00* | (2006.01) |
| *G05B 19/00* | (2006.01) |

(52) U.S. Cl. ............................ 169/30; 169/43; 169/44; 169/45; 169/46; 169/7; 169/8; 169/13; 169/14; 169/16; 700/282; 700/263

(58) Field of Classification Search .................. 169/43, 169/44, 45, 46, 7, 8, 13, 14, 16; 700/282, 700/283

See application file for complete search history.

(56) References Cited

U.S. PATENT DOCUMENTS

| | | | | | |
|---|---|---|---|---|---|
| 128,534 | A * | 7/1872 | Carl | | 169/16 |
| 1,831,880 | A * | 11/1931 | Pierce | | 169/16 |
| 2,678,845 | A * | 5/1954 | Fitter | | 239/248 |
| 3,179,181 | A * | 4/1965 | Banzato | | 169/13 |
| 4,330,040 | A * | 5/1982 | Ence et al. | | 169/13 |
| 4,428,434 | A * | 1/1984 | Gelaude | | 169/13 |
| 4,836,290 | A * | 6/1989 | Le Lande, Jr. | | 169/46 |
| 4,936,388 | A * | 6/1990 | Le Lande, Jr. | | 169/46 |
| 5,125,458 | A * | 6/1992 | Berman | | 169/16 |
| 5,165,482 | A * | 11/1992 | Smagac et al. | | 169/45 |
| 5,263,543 | A * | 11/1993 | Nigro | | 169/56 |
| 6,109,361 | A * | 8/2000 | Henderson | | 169/54 |
| 6,523,616 | B1 * | 2/2003 | Wallace | | 169/70 |
| 6,549,827 | B1 * | 4/2003 | Yen | | 700/282 |
| 6,886,639 | B1 * | 5/2005 | Arvidson et al. | | 169/14 |

* cited by examiner

*Primary Examiner*—Justine R. Yu
*Assistant Examiner*—James S. Hogan
(74) *Attorney, Agent, or Firm*—Sierra Patent Group, Ltd

(57) ABSTRACT

A deployable automatic foam fire suppressant system comprising a pump module having at least one pump coupled to a foam material source, the at least one pump comprising a pump suction component for the supply of water, and a supply module configured for coupling to the pump module, the supply module including at least one supply means having fluid conduit and at least one foam applicator. fluidly coupled to the pump module, wherein the pump module and the supply module are deployable and configured to be operated from a remote location.

19 Claims, 9 Drawing Sheets

DEPLOYABLE AUTOMATIC FOAMING FIRE PROTECTION SYSTEM

CROSS-REFERENCE TO RELATED APPLICATIONS

This application is a U.S. Non-Provisional patent application claiming priority to U.S. Provisional Patent Application Ser. No. 60/515,884 filed Oct. 29, 2003.

BACKGROUND

The development of residential homes and buildings in areas susceptible to wild fires is increasing over time. The homes located in the areas susceptible to wild fires are often wood frame structures with exteriors that have combustible materials. As the quantity and the quality of the homes in the wild fire areas increase, so will the cost of devastation increase when the random wild fire consumes the homes.

Measures have been employed to protect and prevent undue fire damage to the homes susceptible to wild fire. The landscaping in proximity to the house is kept clear of combustible materials. The exterior surfaces of the house are constructed of fire retardant material. Forests are cleared of excessive fuel for fire, such as deadwood and undergrowth. Forest managers plan and perform controlled burns in the forests to minimize the fuel sources for the large and uncontrolled wild fire.

Attempts have been made to apply fire suppressant to houses and buildings in the event of wild fire. Certain fire suppressants comprise man-made materials that are manually sprayed on the exterior of the house in attempt to protect the house from flying embers blown ahead of the wild fire. The fire suppressants are effective at protecting the houses from the onslaught of burning embers and other combustibles.

The prior art has relied on fire teams that manually operate water tankers equipped with foam spraying equipment. The foam is typically a water and soap mixture that creates foam, i.e., a highly dense bubble composition that can be applied to the exterior of the house. The foam is wet and prevents the flow of air over the exterior of the house. The foam suppresses the fire by lowering the temperature of combustion and suffocating the air supply for the fire on the house exterior. The fire teams manually apply the foam to the structure.

However, when the wild fire approaches a house being foamed, the fire teams must cease the manual foam application when the wild fire reaches a certain distance, and retreat to safety. The risk of loss of life far outweighs the need to protect the property. As a result of the cessation of the foam application, the foam runs off the sloped surfaces and dries. The foam eventually becomes ineffective at fire suppression. Ultimately, the abandoned structure can be ignited and lost to the fire.

The unpredictability of the wild fire further diminishes the effectiveness of the manual application of the fire suppressant. The manual fire teams are reluctant to venture into remote areas having limited roads for escape in the event the wild fire changes direction and endangers the fire teams. The fire teams may not have adequate knowledge of the wild fire location, speed and direction. Thus, the fire team's ability to anticipate where to locate and apply the fire suppressant is limited. Since the fire teams must be cautious and have limited means of escape or avoidance of the wild fire, the use of the manual fire suppressant application systems of the prior art are limited and sometimes ineffective.

What is needed in the art is a portable and deployable automatic foam fire suppressant system.

SUMMARY

The disclosed device is directed towards a portable and deployable automatic foam fire suppressant system comprising a pump module including at least one pump coupled to a water source and a foam material source. A supply module is coupled to the pump module. The supply module includes at least one supply means having fluid conduit and at least one foam applicator fluidly coupled to the pump module, wherein the pump module and the supply module are deployable and automatically operated from a remote location.

DETAILED DESCRIPTION

Persons of ordinary skill in the art will realize that the following disclosure is illustrative only and not in any way limiting. Other embodiments of the invention will readily suggest themselves to such skilled persons having the benefit of this disclosure.

The disclosure describes an exemplary portable and deployable automatic foam fire suppressant system. The foam fire suppressant system includes an engine driven pump coupled at the suction side to a supply of water and a foam material injector. The pump is coupled at the discharge to a supply means including a pressure regulator, a mixer and a manifold. The manifold is coupled through fluid conduit to an array of foam dispensers. The portable foam fire suppressant system is fully deployable to a remote location, such as a house in the forest. The water supply, e.g., a water tank, and pump are configured to be set near the house. The supply means is configured to be deployed with the manifold near the house. The array of foam dispensers are configured for placement at a location convenient for applying the water and foam material to a fire. For example, the array of foam dispensers may be configured to mount atop the house and configured to spray a foam solution over the exterior of the house. The portable foam fire suppressant system is configured to be deployed and operate fully automatically from a remote location.

Figure 1:
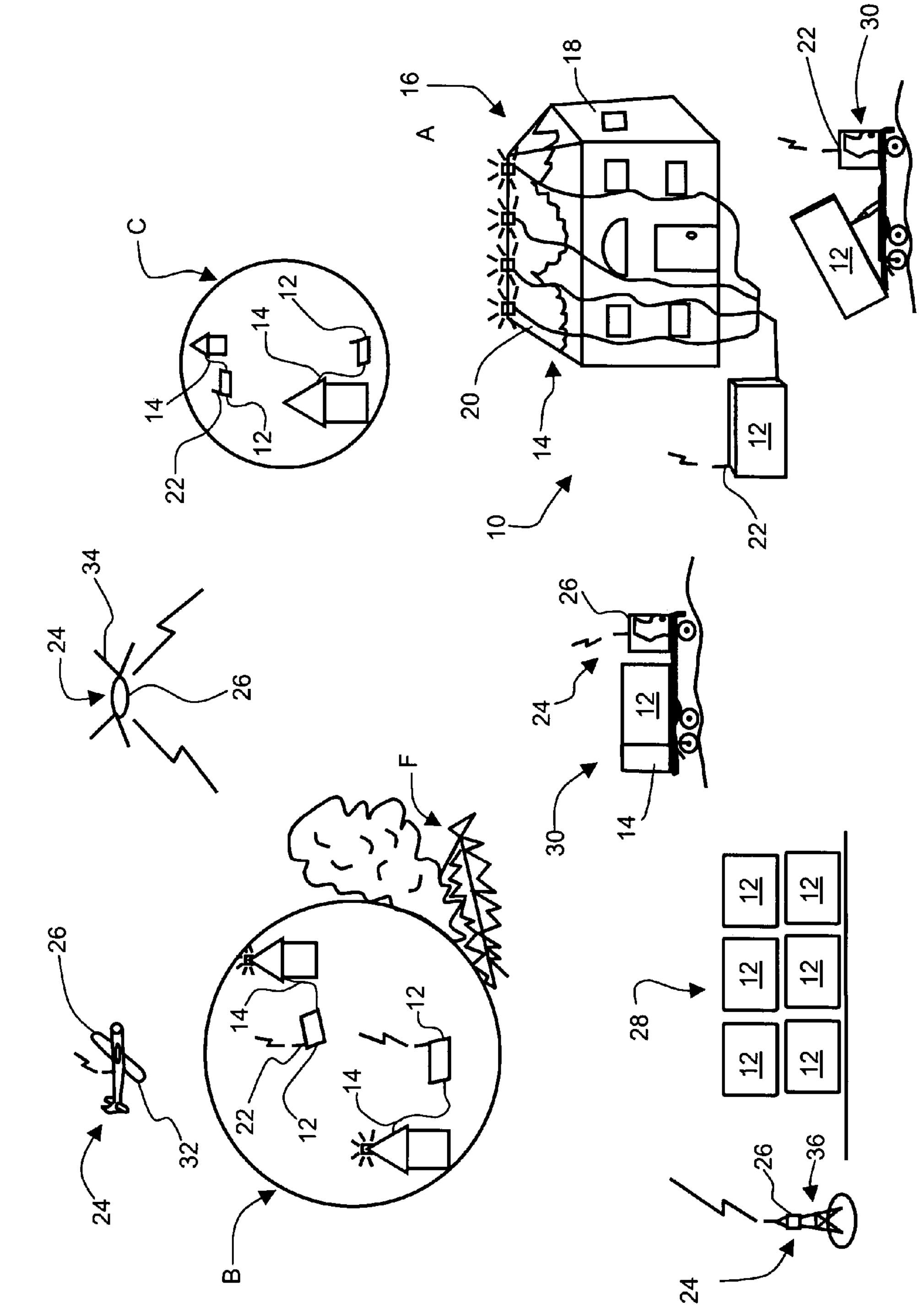
FIG. 1 is a diagram of an exemplary foam fire suppressant system deployed across an entire a region.

Referring to FIG. 1, an exemplary portable and deployable automatic foam fire suppressant system is illustrated as deployed in an entire region. The foam fire suppressant system 10 comprises a pump module 12 fluidly coupled to a supply module 14. The foam fire suppressant system 10 is capable of being deployed in multiple locations simultaneously. The foam fire suppressant system 10 is modularized, as well as remotely operated and remotely synchronized. FIG. 1 illustrates the foam fire suppressant system 10 deployed in various regions depicting areas susceptible to wild fire. At location A, numeral 16, the foam fire suppressant system 10 is deployed and in operation on a house 18. The pump module 12 and supply module 14 are configured to apply a foam solution 20 on the exterior of the house 18. The foam fire suppressant system 10 having been deployed at location A 16 can remain deactivated until needed. The foam fire suppressant system 10 can be remotely activated and controlled. The foam fire suppressant system 10 includes transceiver 22 coupled to signal network 24.

The signal network 24 can communicate with all the foam fire suppressant systems 10 deployed in various regions, such as region B and region C, from multiple communication elements 26. The communication elements 26 can include airplanes, satellites, fire towers, and the like. The communication elements 26 can include transceivers, RF and cell telecommunications, as well as Global Positioning System technologies to locate and deploy the modules 12. The communication elements 26 can track and predict wild fire F locations and coordinate the deployment of the foam fire suppressant system 10 modules 12 and 14.

Also included in the foam fire suppressant system 10 are depots 28 containing modules 12. The modules 12 can be stacked and stored in convenient arrangements that allow for ease of storage as well as rapid deployment.

At least one method of deployment can be with trucks 30 that carry the modules 12 and 14 to a remote location and deploy the modules 12 and 14. Airlifters, planes, helicopters, and the like can also deploy the modules 12 and 14. Upon deployment, the modules 12 and 14 can be set up for automatic remote operation. Water and foam materials being self-contained in the modules 12 and 14 can be activated and operated for long periods of time, applying the fire suppressant on the house or structure. There are no fire fighters required to operate the automatic equipment, thus there is no risk to human life. The modules 12 and 14 can be equipped with sensors as well in order to provide data to the communication elements 26 to enhance the intelligence in the fire fighting effort.

The modules 12 and 14 are constructed and designed to withstand the onslaught of the wild fire. In addition to being properly located away from combustibles, the pumping module 12 can also provide self-protection by self-foaming.

The FIG. 1 illustration demonstrates the deployment of the foam fire suppressant system 10 at the location A and regions B and C. The communication elements 26 can detect and observe the fire F near the region B. The airplane 32, satellite 34 and fire tower 36 can also provide location data, fire intensity and the anticipated direction of the fire. The modules 12 and 14 can be deployed well ahead of the fire F at the proper locations, region B. The modules 12 and 14 can be remotely activated at optimal intervals. As shown, the modules 12 and 14 in region B are activated, providing fire protection, while the modules 12 and 14 at region C are not activated, since the fire F is not near region C.

Figure 2:
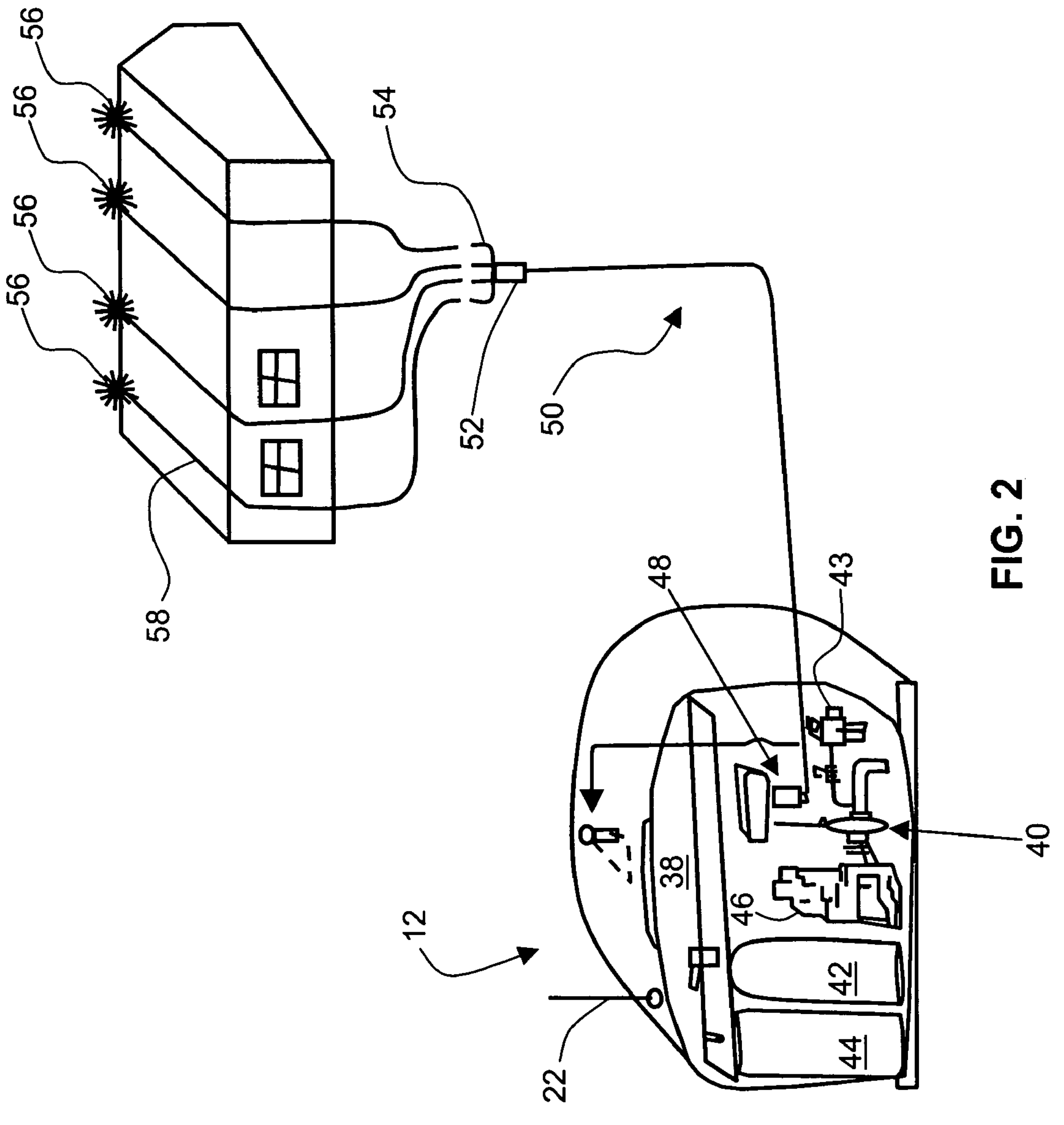
FIG. 2 is a diagram of an exemplary foam fire suppressant system at a single home site.

FIG. 2 illustrates the details of an exemplary embodiment of the foam fire suppressant system 10. The foam fire suppressant system 10 includes the pump module 12 having a water tank 38 coupled to a pump 40 at the suction of the pump 40. It is contemplated that the water tank 38 can be supplemented or replaced by any water source, such as public water supply, a swimming pool, pond, lake, stream, creek, and the like. A foam material supply 42 is also coupled at the suction of the pump 40. An injector pump 43 can be incorporated to inject foam material. A fuel supply 44 is coupled to the engine 46 of the pump 40. The engine 46 can also be an electric motor or any other motive force. The fuel supply 44 can be battery power or electrical power from generators, power lines and the like. At the discharge of the pump 40 is a regulator 48 that controls the flow rate so as to optimize the foaming capacity of the pump module 12. A supply means 50 is coupled to the discharge of the pump 40. The supply means 50 includes hose and fittings that distribute the water and foam material solution. A mixer 52 is coupled inline with the supply of water and foam solution in the supply means 50. The mixer 52 provides the necessary mixing of the solution such that the solution can foam optimally. A manifold 54 distributes the solution to at least one foam applicator (or foam head) 56 fluidly coupled downstream in the supply means 50. The supply means 50 can include steel pipe 58 and other conduit resistant to fire.

Figure 3:
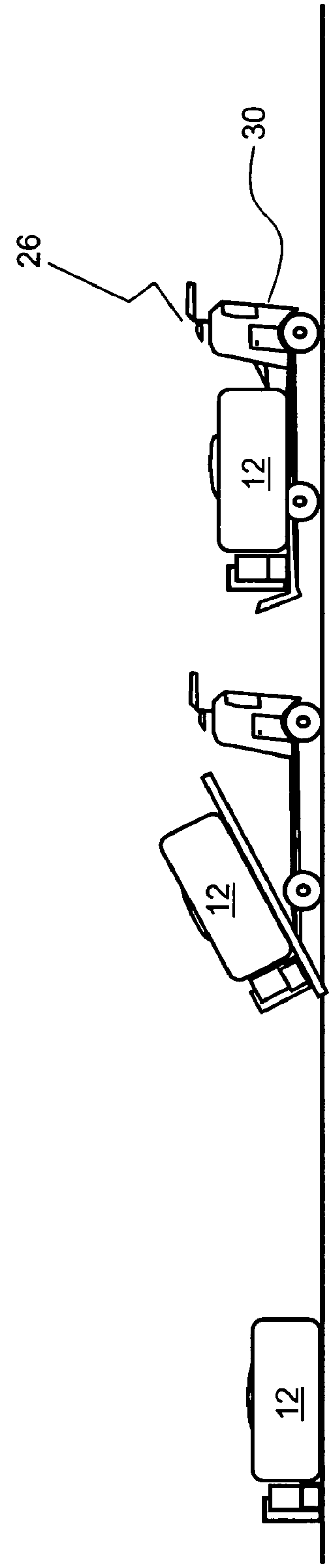
FIG. 3 is a diagram of an exemplary foam fire suppressant system being deployed from a truck.

FIG. 3 illustrates one method of deployment. The truck 30 is shown in sequence rolling off the module 12 at a location. The truck 30 can be telecommunication linked to the communication elements 26.

Figure 4:
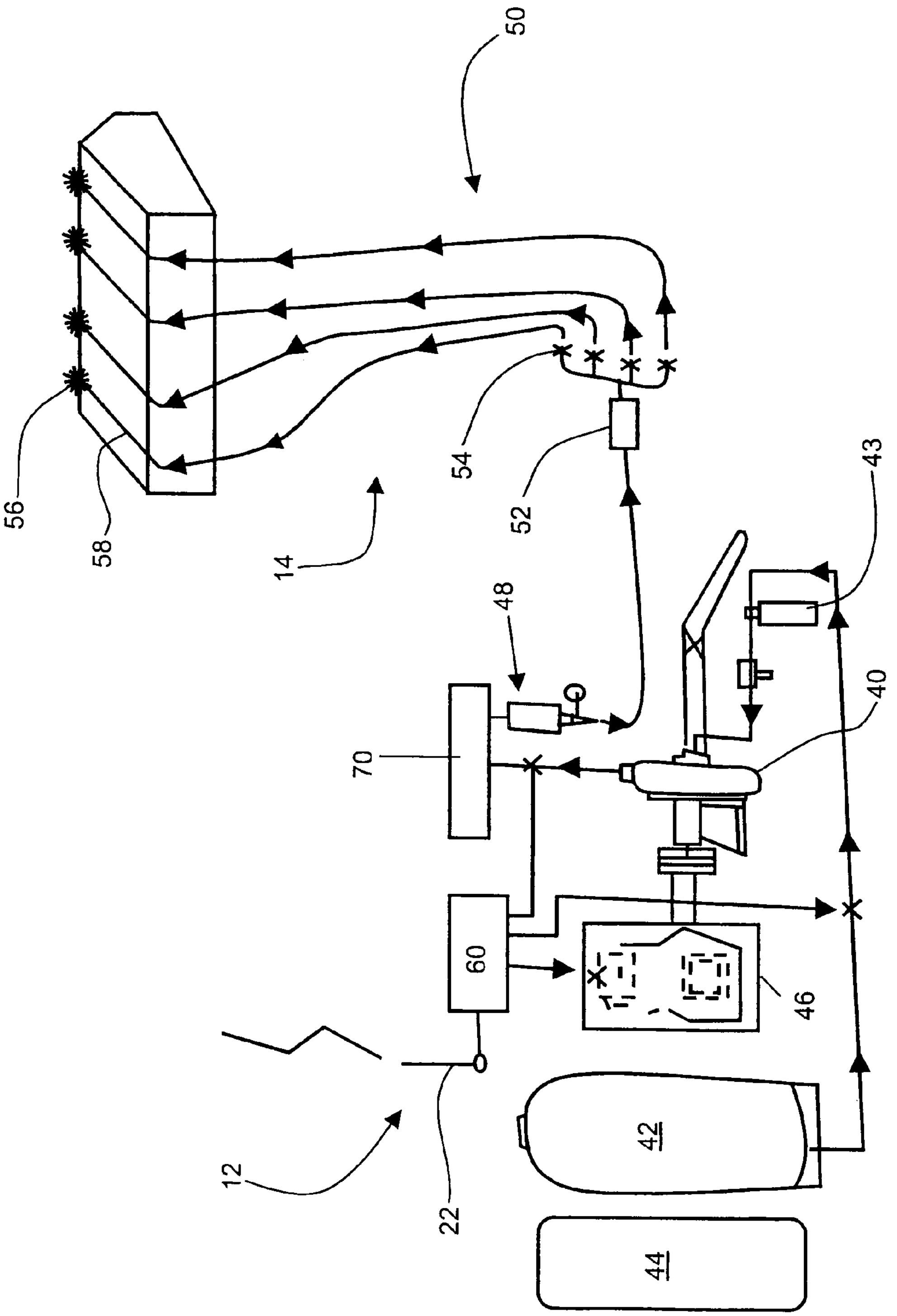
FIG. 4 is a diagram of an exemplary foam fire suppressant system.

FIG. 4 illustrates the foam fire suppressant system in greater detail. The pump module 12 is shown having a remote control 60 with transceiver 22. The pump module 12 can be remotely operated. The pump module 12 may be intermittently operated to conserve water and foam materials.

Figure 5:
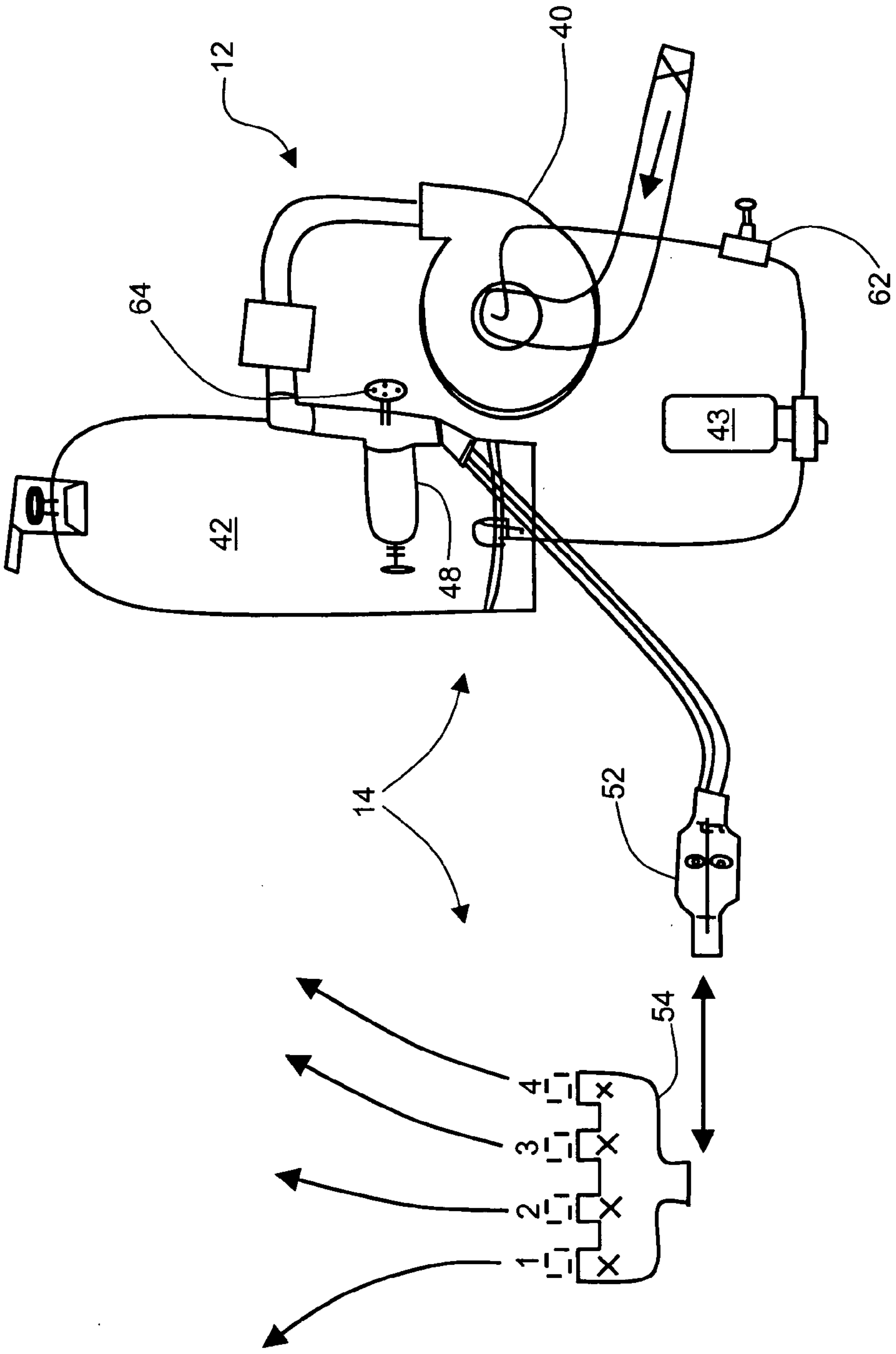
FIG. 5 is a diagram of an exemplary foam fire suppressant system components.
Figure 6:
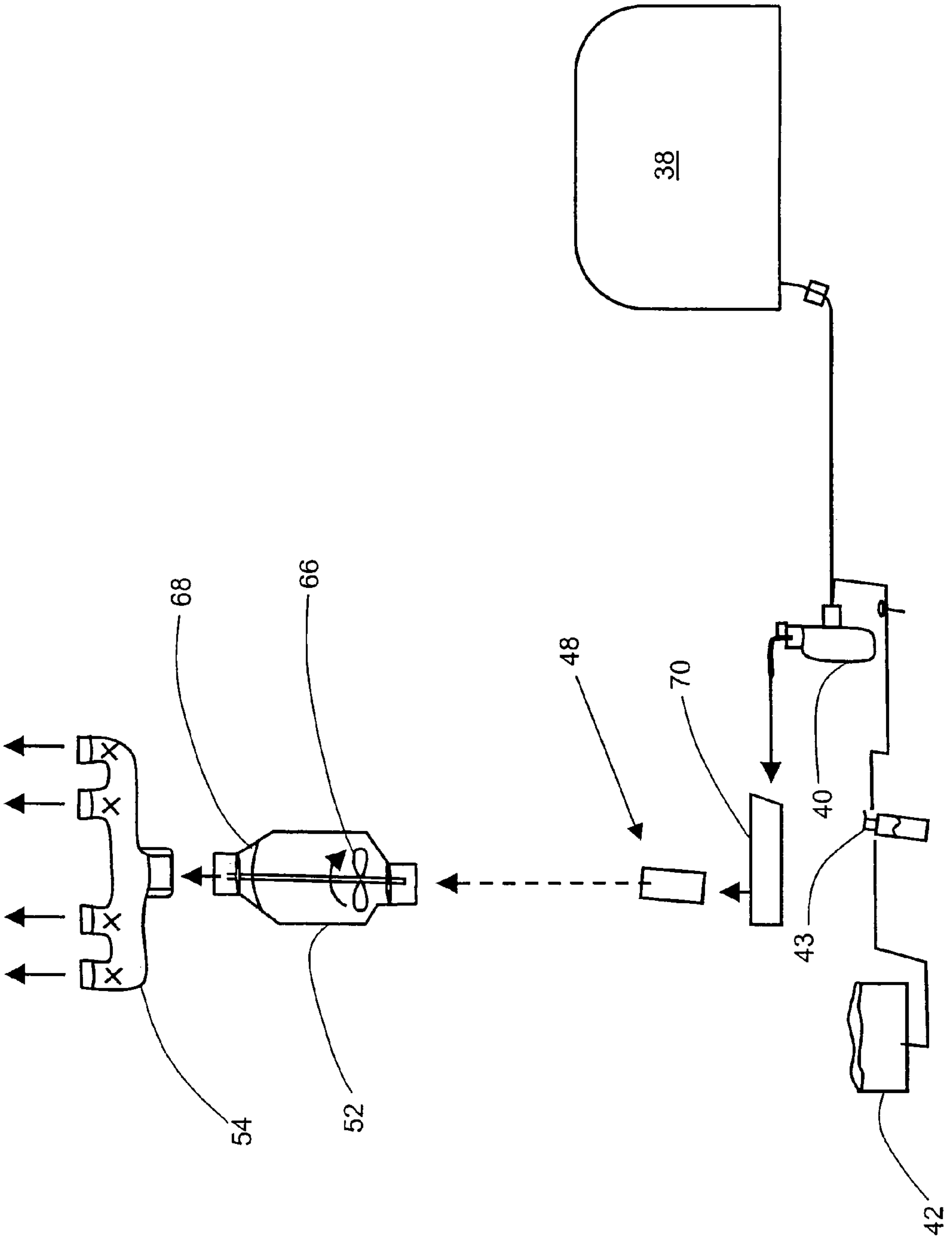
FIG. 6 is another diagram of an exemplary foam fire suppressant system.

FIGS. 5 and 6, illustrate the foam fire suppressant system components in more detail. The pump module 12 can include foam material controls 62 and gauges 64 that enhance the production of the foam material. The mixer 52 can include an impeller 66 and a screen 68 that mix the solution of water and foam materials. A mixing chamber 70 can be employed between the discharge of the pump 40 and the regulator 48. Improved solution mixing can be obtained with the mixing chamber 70.

Figure 7:
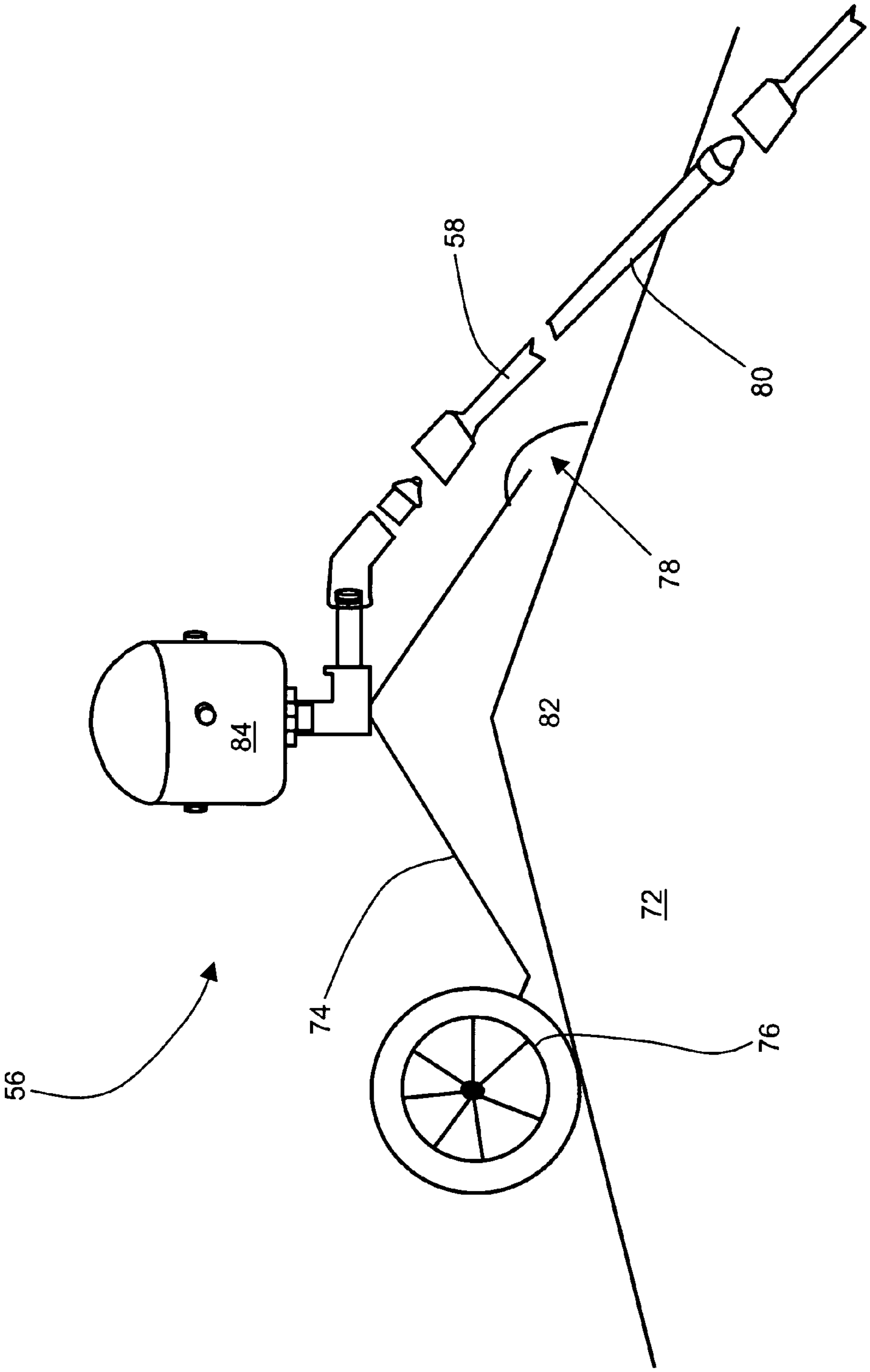
FIG. 7 is a diagram of an exemplary foam fire suppressant system foam applicator.
Figure 8:
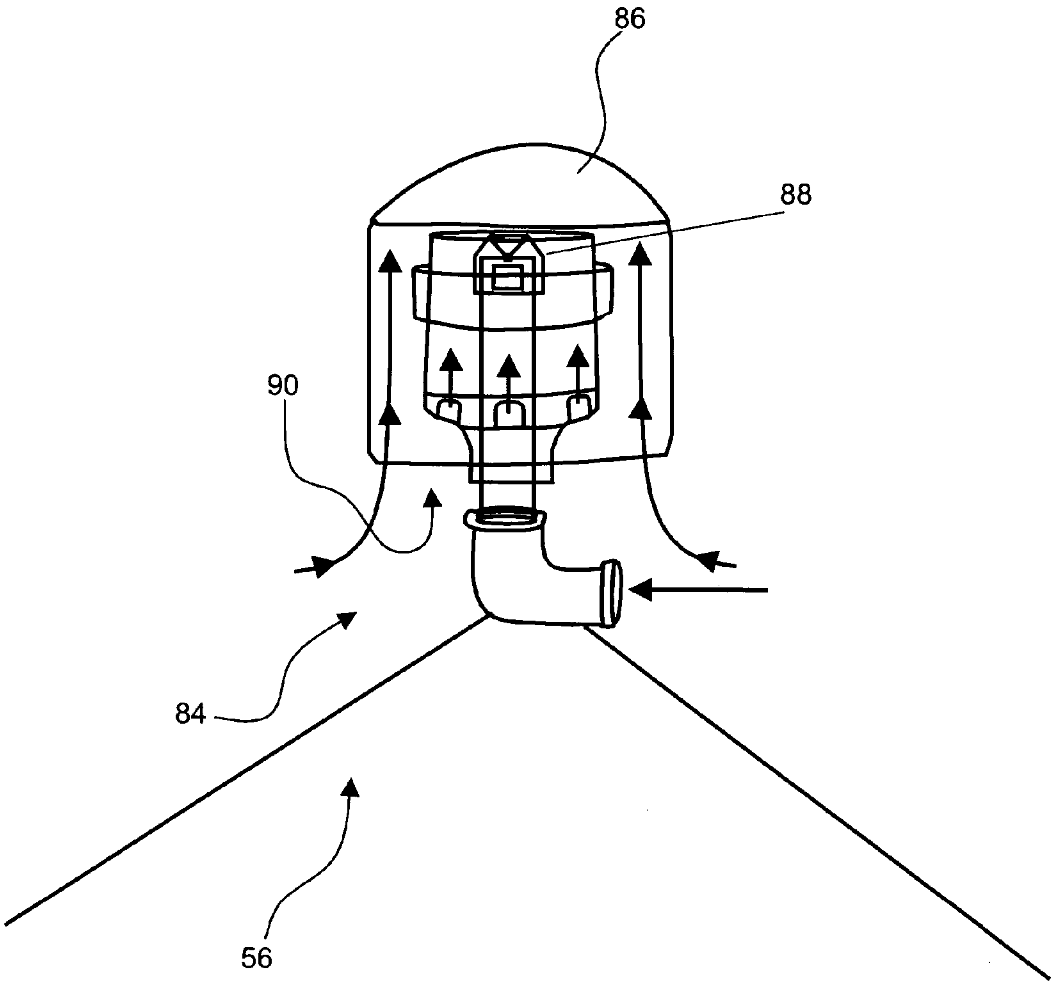
FIG. 8 is another diagram of an exemplary foam fire suppressant system foam applicator.
Figure 9:
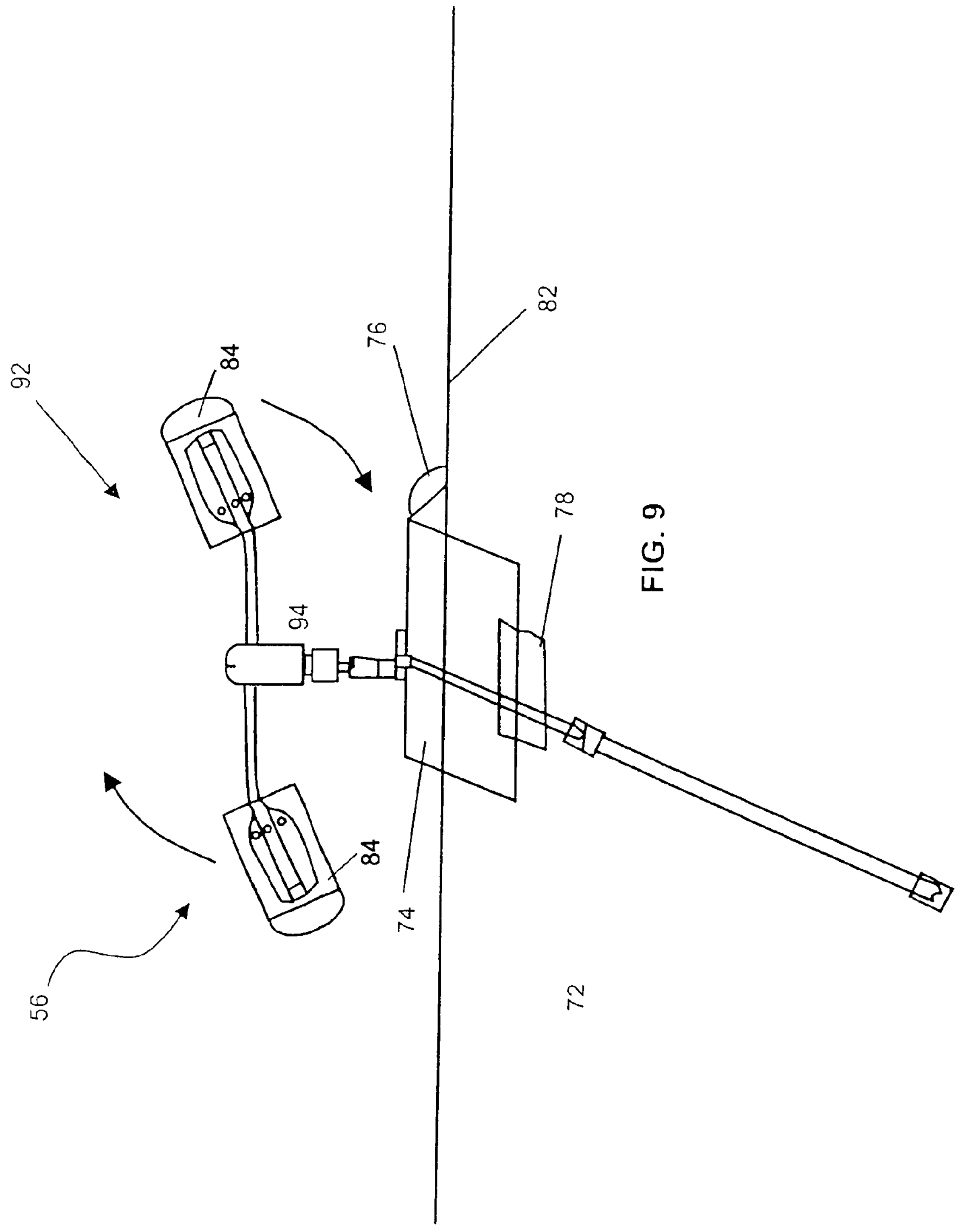
FIG. 9 is a diagram of an alternative foam fire suppressant system foam applicator.

FIGS. 7, 8 and 9 illustrate exemplary embodiments of foam applicators 56. The foam applicator 56 is deployed in locations that allow for the application of the foam to the exterior surfaces of the house. A roof 72 of the house is vulnerable to the approach of combustible materials, such as flying hot embers. The roof 72 is a preferred place to locate the foam applicators 56. The foam applicator 56 in FIG. 7 includes special features. The foam applicator 56 includes a carriage 74 having rollers 76, such as wheels, at a first end and a skid rest 78 at an opposite end. The foam applicator 56 can be deployed with a long pole 80 by pushing the foam applicator 56 up the roof 72 with the pole 80. The pole 80 can be the steel pipe 58 in links. The rollers 76 traverse the roof 72 and cross the roof ridge 82. The skid 78 catches the roof 72 such that with the V shape of the carriage 74, the roller 76 and skid 78, the foam applicator 56 is stabilized and securely mounted on the roof ridge 82. The foam applicator 56 includes a head 84 that includes a screen dome 86 disposed over a spray tip 88. The foam applicator 56 includes air inductors 90 that induce air flow into the head 84 promoting air and water/foam solution mixing.

In an alternative exemplary embodiment shown in FIG. 9, the foam applicator 56 can include a dual head 92 design. The dual head 92 includes heads 84 aligned on opposite sides of a rotating boom 94. The heads 84 rotate in a circular motion such that the heads 84 scoop air and aerate the foam material/water mixture discharging from each spray tip 88.

While embodiments and applications of this disclosure have been shown and described, it would be apparent to those skilled in the art that many more modifications than mentioned above are possible without departing from the inventive concepts herein. The disclosure, therefore, is not to be restricted except in the spirit of the appended claims.

What is claimed is:

1. A deployable automatic foam fire suppressant system comprising:

a pump module having at least one pump coupled to a foam material source, said at least one pump comprising a pump suction component for the supply of water, and an injector pump configured to inject foam material from said foam material source; and a supply module configured for coupling to said pump module, said supply module including at least one supply means having fluid conduit and at least one foam applicator fluidly coupled to said pump module, wherein said pump module and said supply module are deployable and configured to be operated from a remote location.

2. The system of claim 1, wherein said pump suction component is coupled to a water source.

3. The system of claim 1, wherein said pump module further comprises a transceiver configured to communicate with at least one communication element for remote operation.

4. The system of claim 3 further comprising at least one sensor for providing information about a fire to said at least one communication element.

5. The system of claim 1, wherein said pump module and said supply module are configured to withstand the heat of a fire.

6. The system of claim 1, wherein said pump module is configured to provide self-protection by self-foaming.

7. The system of claim 1, wherein said pump module further comprises an engine coupled to said at least one pump.

8. The system of claim 7, wherein said pump module further comprises a fuel supply coupled to said engine.

9. The system of claim 1, wherein said pump module further comprises a regulator that controls the flow rate of water and foam material.

10. The system of claim 9, wherein said pump module further comprises a mixing chamber employed between said pump and said regulator to improve the mixing of water and foam material.

11. The system of claim 1, wherein said supply module further comprises a mixer, having an impeller and a screen, coupled inline with said supply means.

12. The system of claim 1, wherein said supply module further comprises a manifold for distributing water and foam material from said pump module to said at least one foam applicator.

13. The system of claim 1, wherein said fluid conduit is resistant to fire.

14. The system of claim 1, wherein said fluid conduit is steel pipe.

15. The system of claim 1, wherein said pump module further comprises foam material controls and gauges for enhancing production of foam material from said foam material source.

16. The system of claim 1, wherein said foam applicator comprises a carriage having a first end and a second end opposite said first end, said first end having at least one roller and said second end having at least one skid rest, said foam applicator being configured for deployment on a roof.

17. The system of claim 1, wherein said foam applicator comprises a head having a screen dome, at least one air inductor for inducing air flow into said head and at least one spray tip, said screen dome disposed over said at least one spray tip.

18. The system of claim 1, wherein said foam applicator includes a dual head design comprising two heads aligned on opposite sides of a rotating boom.

19. A method for providing a deployable automatic foam fire suppressant system comprising:

providing a pump module having at least one pump coupled to a foam material source, said at least one pump comprising a pump suction component for the supply of water, and an injector pump configured to inject foam material from said foam material source; and providing a supply module configured for coupling to said pump module, said supply module including at least one supply means having fluid conduit and at least one foam applicator fluidly coupled to said pump module, wherein said pump module and said supply module are deployable and configured to be operated from a remote location.

* * * * *